(12) United States Patent
Lightner

(10) Patent No.: US 6,420,533 B1
(45) Date of Patent: Jul. 16, 2002

(54) METHOD TO SEPARATE SODIUM FROM LIGNINS AND PRODUCE A SODIUM CONTAINING SOLUTION FOR RECYCLE

(76) Inventor: Gene E. Lightner, 706 SW. 296$^{th}$ St., Federal Way, WA (US) 98023

( * ) Notice: Subject to any disclaimer, the term of this patent is extended or adjusted under 35 U.S.C. 154(b) by 0 days.

(21) Appl. No.: 09/633,006

(22) Filed: Aug. 4, 2000

(51) Int. Cl.$^7$ .............................................. C08L 97/00
(52) U.S. Cl. ...................... 530/500; 530/205; 530/208; 527/400; 527/604; 524/73; 210/634; 210/767; 210/194
(58) Field of Search ................................ 530/205, 208, 530/500; 527/400, 604; 524/73; 210/634, 767, 194

(56) References Cited

U.S. PATENT DOCUMENTS

| | | | | |
|---|---|---|---|---|
| 4,087,318 A | * | 5/1978 | Samuelson et al. | 162/60 |
| 4,221,708 A | * | 9/1980 | Lin | 260/124 R |
| 4,332,589 A | * | 6/1982 | Lin | 8/557 |
| 5,529,663 A | * | 6/1996 | Springer | 162/76 |

* cited by examiner

Primary Examiner—Samuel A. Acquah

(57) ABSTRACT

This method will produce depolymerized lignins substantially free from sodium compounds. Black liquor supplied from a pulping process is utilized for providing a mixture of depolymerized lignins dispersed and dissolved in absolution containing sodium hydroxide. The mixture is then separated to form depolymerized lignins and a solution containing sodium hydroxide. Following separation, the depolymerized lignins are then extracted with water to produce an extractate containing water soluble sodium compounds. The extracted depolymerized lignins, containing sodium compounds, are then reacted with an acid to form sodium salts. The solution containing sodium salts is then separated from the extracted depolymerized lignins to produce substantially sodium free depolymerized lignins. The separated solution containing sodium hydroxide is combined with the extractate and the combination, subsequent to removal of water, is made available to reuse for recycle to depolymerize, disperse and dissolve additional lignins. As a result a mixture containing depolymerized lignins is created.

21 Claims, 3 Drawing Sheets

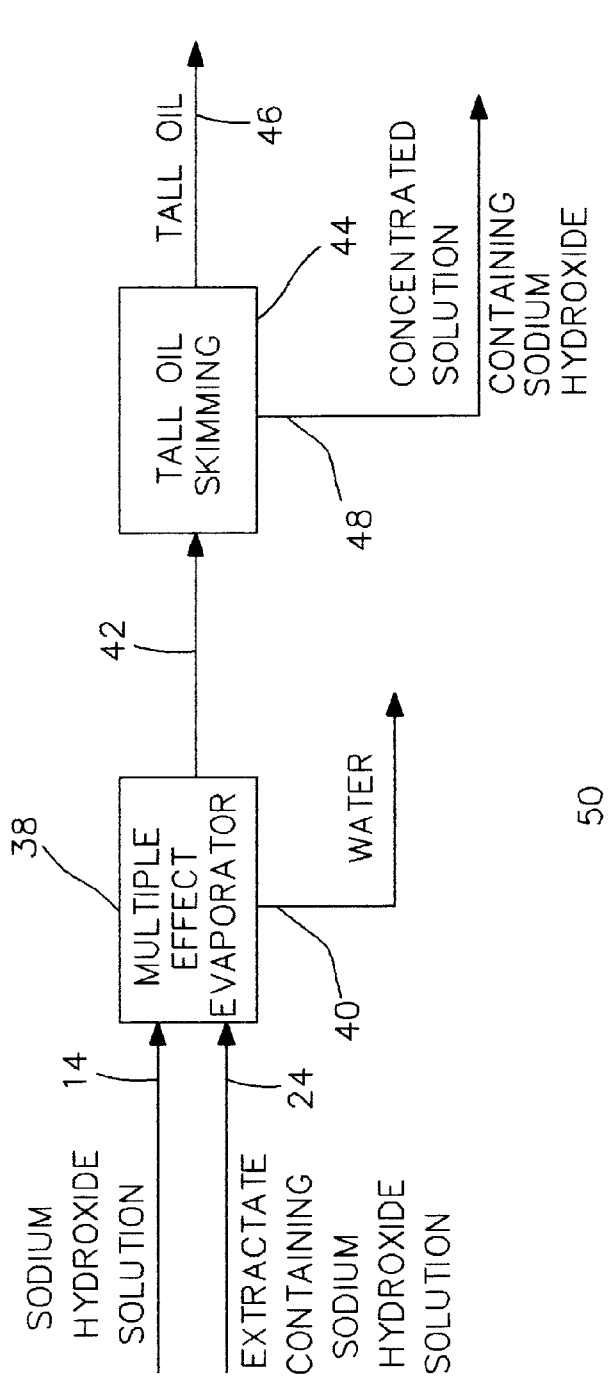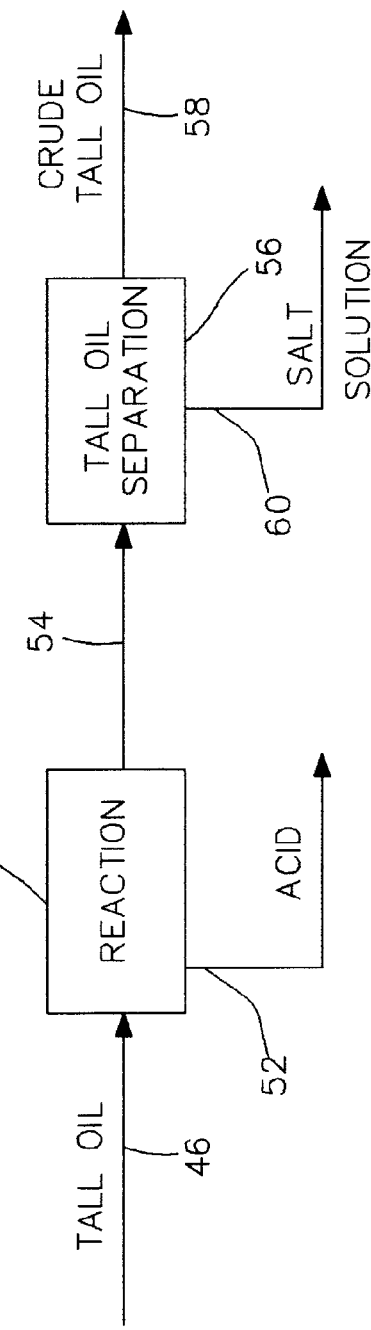

METHOD TO SEPARATE SODIUM FROM LIGNINS AND PRODUCE A SODIUM CONTAINING SOLUTION FOR RECYCLE

BACKGROUND OF THE INVENTION

Pulping processes are employed to separate lignins from wood to produce a pulp. A solution containing sodium hydroxide is employed to dissolve lignins from the wood to yield a black liquor containing sodium hydroxide and depolymerized lignins. A recovery boiler is used to recover the sodium hydroxide and other compounds for reuse and release of the energy contained in the lignins to provide steam.

A state of the art Kraft pulping digestion process employs a solution containing sodium hydroxide and sodium sulfide to create a black liquor. After concentration of the black liquor, by means of a multiple-effect evaporator, the black liquor is sent to a recovery boiler to produce steam and a molten smelt containing sodium carbonate. The smelt of melted sodium compounds flows to a vat where it dissolves into green liquor The green liquor is slaked by calcium oxide to convert the sodium carbonate to furnish sodium hydroxide The calcium oxide, as a result, is converted to calcium carbonate which settles at the bottom of a white liquor clarifier tank. The resulting calcium carbonate, after separation of adhering white liquor, is transported to a lime kiln where the calcium carbonate is converted to calcium oxide. Thus the black liquor recovery cycle is completed.

Another pulping process employs a solution derived from sulfur burned to produce sulfur dioxide. The sulfur dioxide forms a bisulfite from a base, often magnesium, to form a solution. The solution containing bisulfites is used to depolymerize, disperse and dissolve lignins and create a "sulfite waste liquor." In the process, soluble lignin sulfonic acid salts are formed from the solution. Recovery of the "sulfite waste liquor" is performed with a recovery boiler to produce sulfur dioxide and the inorganic base. Accordingly the recovery cycle has been completed Thus, it is believed that only elaborate recovery methods have yet been developed.

This invention relates to a method of recycling a solution containing sodium hydroxide without using a recovery boiler, a lime kiln or a smelt.

Therefore, an object of this invention is to obviate many of the limitations and disadvantages of the prior art to depolymerize lignins from a solution containing sodium hydroxide.

Another object of this invention is to produce depolymerized lignins significantly free of sodium compounds.

Still another object of this invention is to produce depolymerized lignins significantly free of sodium compounds for use as a fuel.

An additional object of this invention is to provide recycling of a solution containing sodium hydroxide used to produce depolymerized lignins.

An significant object of this invention is to utilize a multiple-effect evaporator, previously required to concentrate black liquor, to remove water from the solution containing sodium hydroxide.

One more object of this invention is to separate black liquor from a soda pulping digestion process to produce depolymerized lignins and a solution containing sodium hydroxide With the above and other objects in view, this invention relates to the novel features and alternatives and combinations presently described in the brief description of the invention.

PHRASEOLOGY APPLIED IN THE INVENTION

Lignins in the presence of a solution containing sodium hydroxide, at an elevated temperature, will depolymerize, disperse and dissolve lignins to form a black liquor. The term depolymerized lignins is often applied to lignins in a solution containing sodium hydroxide to depolymerize, disperse and dissolve lignins. Lignins are not well structured polymers. When a lignin polymer is fractured the term "depolymerized lignins" is often utilized even though no definite "lignin monomer" exists. The term "depolymerized lignin" is used interchangeably to designate lignins.

This invention relates to a black liquor or any mixture of sodium hydroxide containing depolymerized lignins, dispersed and dissolved in a solution containing sodium hydroxide. The mixture of sodium hydroxide containing depolymerized lignins dispersed and dissolved in a solution containing sodium hydroxide is generally separated by a membrane to provide depolymerized lignins and a solution: containing sodium hydroxide. The membrane, for example, can be a diffusion membrane or a nano filtration membrane. After separating, the depolymerized lignins are then counter flow extracted with water to produce depolymerized lignins substantially free of water soluble sodium compounds and an extractate containing water soluble sodium compounds. The previously extracted depolymerized lignins, substantially free of water soluble sodium compounds, necessitates an admixture of an acid to the depolymerized lignins to produce sodium salts from the depolymerized lignins containing sodium compounds. Depolymerized, lignins are prone to self condensation under acidic conditions. A solution of sodium salts is divided from the depolymerized lignins to produce depolymerized lignins free of sodium and a solution of sodium salts. The solution containing sodium hydroxide and the extractate are then combined and treated in a salt splitting procedure to remove salts and form sodium hydroxide and then the solution containing sodium hydroxide is evaporated to remove water to concentrate the solution. The concentrated solution regularly contains about 40% sodium hydroxide to about 10% sodium hydroxide. Either the solution containing sodium hydroxide or the concentrated solution must have salts removed by a salt splitter to prevent salt buildup in the concentrated solution. A salt splitting operation often utilizes either a bipolar membrane or an ion exchange resin to remove the anion from the salt. As a result sodium hydroxide is created from the salt. Salt splitting is dependent on a salt splitting action. Salt splitting is frequently accomplished with an aion ion exchange resin. The concentrated solution is then skimmed of tall oil containing sodium. Tall oil resembles a soap possessing sodium. The resulting tall oil, after separation from the concentrated solution, is then reacted with an acid to form a salt solution phase and a phase of crude tall oil.

The salt solution phase is combined with the solution of sodium salts, from the acidification of the depolymerized lignins containing sodium compounds, and then subjected to salt splitting, for example a bipolar membrane, to form a solution of sodium hydroxide and a solution of an acid and a solution of un-coverted sodium salts. The solution of un-coverted sodium salts, with water removed, is then recycled to the salt splitter. Purges are performed, as necessary, to prevent buildup of undesired impurities.

The multiple-effect evaporator, previously required to concentrate black liquor, is capable of being applied to remove water from the solution containing sodium hydroxide to produce "white liquor" for recycle. A multiple-effect evaporator is often employed in concentrating a solution, by removal of water. Means to separate the depolymerized lignins will depend on depolymerized lignins molecular properties including molecular size, density and diffusion rate. Membranes can be selected from the group of membranes including diffusion membranes and nano filtration membranes. Several other means of separation depend on depolymerized lignins molecular properties include cooling, adsorption, absorption, retardation, filtration and diffusion.

For supplementary particulars on lignin, for example, refer to *Pulp And Paper Technology* pages 33–36.

For information on tall oil, for example, refer to *KIRK-OTHMER ENCYCLOPEDIA OF CHEMICAL TECHNOLOGY FIFTH EDITION VOLUME* 23, pages 615–622. Membranes, providing a means for separation, may employ a diffusion membrane, an ultra filtration membrane or a nano filtration membrane such as described, for example, in the bulletins supplied by membrane manufacturers Aqualytics and Desal membrane products, Inc. respectively.

Salt splitting, for example, is described in bulletins provided by several companies including Aqualytics and Dow Chemical Company.

BRIEF DESCRIPTION OF THE INVENTION

The present invention, in its broadest aspect, is a method to yield depolymerized lignins separated from a solution containing sodium hydroxide. This invention defines a method to produce a lignin, substantially free of sodium compounds, and a solution made suitable for reuse to depolymerize, disperse and dissolve additional lignins. The method, depicted herein, originates from a mixture of depolymerized lignins dispersed and dissolved in a solution containing sodium hydroxide. The mixture containing depolymerized lignins and sodium hydroxide is substantially separated from the depolymerized lignins to supply a solution containing sodium hydroxide separated from the depolymerized lignins and will provide depolymerized lignins for extraction. The depolymerized lignins are then counter flow extracted with water to substantially extract water soluble sodium compounds from the depolymerized lignins and establish an extractate containing water soluble sodium compounds. The extracted depolymerized lignins normally contains sodium compounds. Addition of an acid to the depolymerized lignins will produce water soluble sodium salts and free the sodium contained in the depolymerized lignins. The neutralized depolymerized lignins forms a phase of a solution containing sodium salts and an insoluble phase of depolymerized lignins. Separation of the salt phase will provide depolymerized lignins substantially free of sodium salts. The salt phase is then converted to a solution of sodium hydroxide by means of a salt splitting technique.

Key features of this invention are:

Separating depolymerized lignins from sodium compounds.

The solution containing sodium hydroxide is subject to recycle for employment to depolymerize, disperse and dissolve additional lignins.

Production of depolymerized lignins, substantially free of sodium, is suitable to fire boilers to avoid explosions due to the presence of sodium.

Recycle of substantially all of the sodium compounds as sodium hydroxide and sodium sulfide.

DESCRIPTION OF THE PREFERRED EMBODIMENT

The preferred embodiment of this invention reveals a method to produce depolymerized lignins substantially free from sodium compounds. A mixture of depolymerized lignins dispersed and dissolved in a solution containing sodium hydroxide is provided from wood. The mixture is separated to from depolymerized lignins and a liquid containing sodium hydroxide. The separated depolymerized lignins are then extracted by water to produce an extractate and a rafinate of depolymerized lignins. Sodium compounds contained in the rafinate of depolymerized lignins will be formed into water soluble salts by addition of an acid. Separation of the water soluble salts from the depolymerized lignins will provide depolymerized lignins substantially free of sodium. The solution previously separated will be used to depolymerized additional lignins. As a consequence, a mixture containing depolymerized lignins is achieved.

BRIEF DESCRIPTION OF THE DRAWINGS

The features that are considered characteristic of this invention are set forth in the appended claims. This invention, however, both as to its origination and method of operations as well as additional advantages will best be understood from the following description when read in conjunction with the accompanying drawings in which:

FIG. 2 is a flow sheet denoting a method to separate tall oil from a concentrated solution containing sodium hydroxide.

FIG. 3 is a flow sheet denoting a method for forming crude tall oil.

DETAILED DESCRIPTION OF THE PREFERRED EMBODIMENT

In the preferred embodiments of the present invention a mixture containing depolymerized lignins and sodium hydroxide is furnished.

Figure 1:
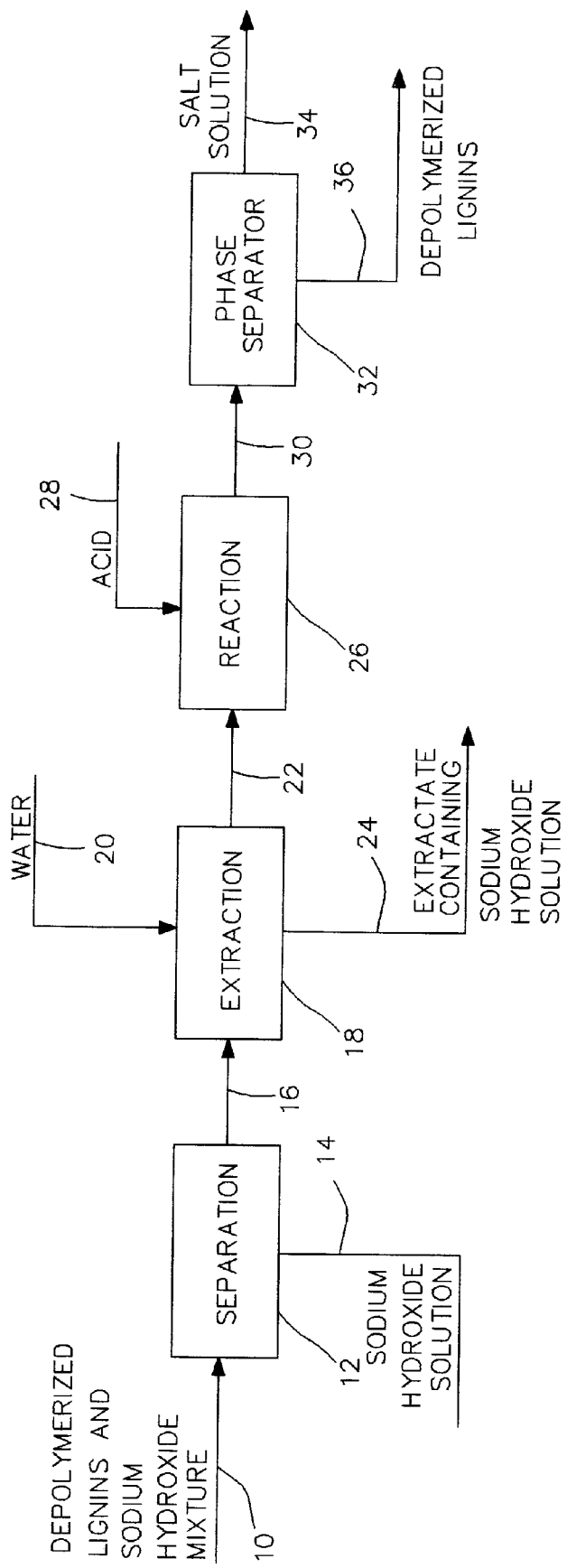
FIG. 1 is a flow sheet denoting the invention as set forth in the appended claims.

The flow diagram of FIG. 1 illustrates the general preferred embodiments of the present invention. In the diagram, rectangles represent stages or functions of the present invention and not necessarily separate components. Arrows indicate direction of flow of material in the method.

Referring to FIG. 1, a mixture containing depolymerized lignins and sodium hydroxide 10, is conveyed into a separation stage 12, where depolymerized lignins are concentrated 16, and forwarded to a counter flow extraction stage 18. Water 20, is employed for extracting to provide an extractate containing sodium hydroxide 24, and a rafinate of depolymerized lignins 22. The rafinate is transferred to a reaction stage 26, and reacted with an acid 28, to form a mixture containing depolymerized lignins and sodium salts 30. The mixture 30, is then transferred to a phase separation stage 32, to separate insoluble phases of a salt solution 34, and a phase of depolymerized lignins 36. Depoymerized lignins 36, substantially devoid of sodium compounds are available for use as a fuel. The solution containing sodium hydroxide 14, and the extractate 24, are made available to depoymerize, disperse and dissolve additional lignins to form an additional mixture. The extraction stage 18, is customarily operated in a counter flow manner. The acid 28, can be selected from the group of inorganic acids including sulfuric acid and hydrochloric acid including an individual or a combination of these acids or an acid selected from the group of organic acids including acetic acid and formic acid including an individual or a combination of these acids thereof. The acid 28, can be carbon dioxide provided from a flue gas. The reaction stage 26, regularly releases hydrogen sulfide as a gas,(not shown in FIG. 1), and is reacted with sodium hydroxide to form sodium sulfide. The separator 32, is customarily operated as a classifier to separate insoluble phases by gravity.

Referring to FIG. 2, a flow sheet is portrayed denoting a method to concentrate a sodium hydroxide solution and skim tall oil from the solution of concentrated sodium hydroxide. A solution containing sodium hydroxide 14, and an extractate 24, containing sodium hydroxide is conveyed to a multiple-effect evaporator stage 38, to remove water 40, to produce a concentrated solution containing sodium hydroxide 42, which is then transferred to a tall oil skimming stage 44, to remove tall oil 46, from a concentrated solution containing sodium hydroxide 48. The concentrated solution containing sodium hydroxide 48, may then be sent to a salt splitting operation, to remove sodium salts, before being employed to depoymerized and dissolve additional lignins. The tall oil 46, can be used as is or reacted with an acid to form crude tall oil.

Referring to FIG. 3, a flow sheet is portrayed denoting a method to produce crude tall oil. Tall oil 46, from FIG. 2, is conveyed to a reaction stage 50, to react with an acid 52, to form a mixture of salt and crude tall oil 54, which is then advanced to a tall oil separation stage 56, to separate crude tall oil 58, from a salt solution 60. The crude tall oils 58, customary forms a micell and is frequently slow to separate. The crude tall oils 58, is consequently free of sodium. The formed salt solution 60, is usually combined with the salt solution 34, from FIG. 1. The reaction stage 50, usually releases hydrogen sulfide as a gas,(not shown in FIG. 3), and is reacted with sodium hydroxide to form sodium sulfide.

Figure 4:
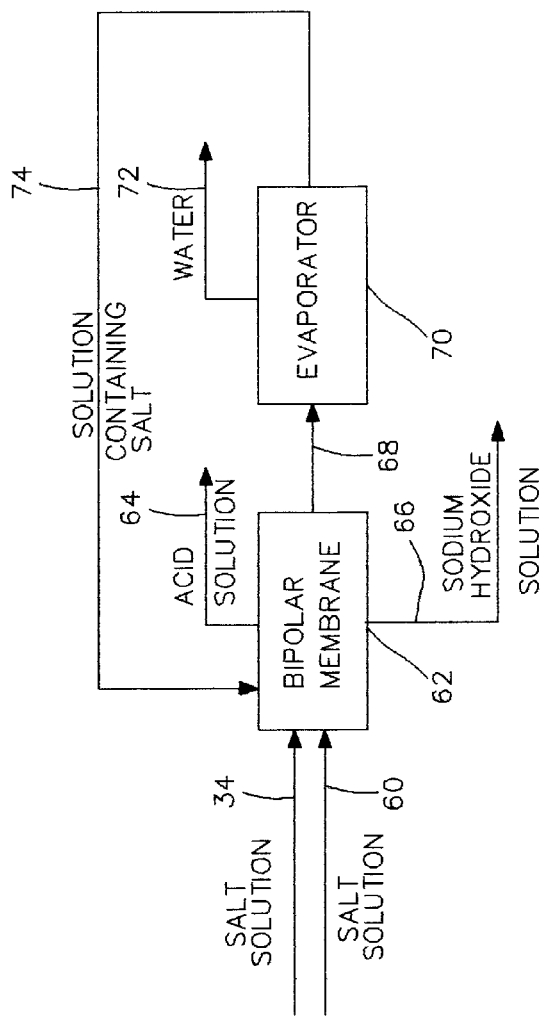
FIG. 4 is a flow sheet denoting a method for bipolar membrane salt splitting.

Referring to FIG. 4, a flow sheet is portrayed denoting a method for bipolar membrane salt splitting. A salt solution 34, from FIG. 1, and a salt solution 60, from FIG. 3, after combining in a bipolar membrane 62, where the salt is converted and removed as an acid solution 64, and a sodium hydroxide solution is removed 66, and an unconverted salts solution is formed 68. The unconverted salts solution 68, is then fed to an evaporator stage 70, to remove water 72, and produce a solution containing salt 74, for recycle to the bipolar membrane stage 62.

Figure 5:
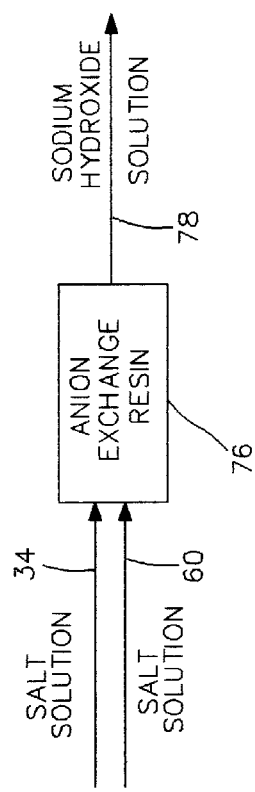
FIG. 5 is a flow sheet denoting an anion exchange method for salt splitting.

Referring to FIG. 5, a flow sheet is portrayed denoting an anion exchange method for salt splitting. A salt solution 34, from FIG. 1, and a salt solution 60, from FIG. 3, are combined in a anion exchange resin 76, where the salt is converted to a sodium hydroxide solution 78. The anion exchange resin 76, will consequently remove anions contained in the salt.

Figure 6:
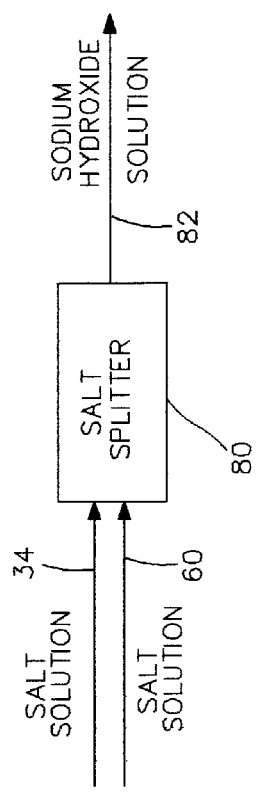
FIG. 6 is a flow sheet denoting a universal method for salt splitting a solution containing salts.

Referring to FIG. 6, a flow sheet is portrayed denoting a universal method for salt splitting a solution containing salts. A salt solution 34, from FIG. 1, and a salt solution 60, from FIG. 3, are combined in a salt splitter stage 80, where the salt is converted to a sodium hydroxide solution 82. The salt splitter stage 80, can be, as examples, a bipolar membrane or an anion exchange resin.

What is claimed is:

1. A method to produce depolymerized lignins substantially free from sodium compounds, which comprises:
   providing a mixture of depolymerized lignins dispersed and dissolved in a solution containing sodium hydroxide, and providing a means for separation of depolymerized lignins from a solution containing sodium hydroxide, and separating said depolymerized lignins from said solution containing sodium hydroxide to provide an solution containing sodium hydroxide and the separated depolymerized lignins, and extracting with water the depolymerized lignins containing water soluble sodium compounds to provide an extractate containing water soluble sodium compounds and a rafinate containing depolymerized lignins, and combining said solution containing sodium hydroxide with said extractate to form a sodium hydroxide solution, and concentrating said sodium hydroxide solution by removal of water by a multiple-effect evaporator to concentrate the sodium hydroxide solution, and combining an acid with the heretofore extracted depolymerized lignins to produce water soluble sodium salts to form a phase of water soluble sodium salts and a phase containing depolymerized lignins substantially free of sodium compounds, and separating said depolymerized lignins phase from said water soluble sodium salts phase to yield depolymerized lignins substantially free of sodium compounds and a solution of water soluble sodium salts whereby depolymerized lignins substantially free of sodium compounds and a solution of concentrated sodium hydroxide suitable for reuse to depolymerized, disperse and dissolve additional lignins are created.

2. The method as described in claim 1 wherein means for separation of depolymerized lignins from a solution containing sodium hydroxide is a membrane.

3. The method as described in claim 1 wherein the heretofore concentrated sodium hydroxide solution is substantially separated from tall oil contained in the concentrated sodium hydroxide solution.

4. The method as described in claim 3 wherein the heretofore separated tall oil is reacted with an acid to form a phase of sodium salts and a phase of crude tall oil.

5. The method as described in claim 4 wherein the crude tall oil is used as a fuel.

6. The method as described in claim 1 wherein said phase of water soluble sodium salts is combined with the phase of sodium salts described by claim 4 to create a solution containing sodium salts.

7. The method as described in claim 6 wherein said solution containing sodium salts is dependent on a salt splitting action to create sodium hydroxide and create an acid from the solution containing sodium salts.

8. The method as described in claim 1 wherein the concentrated sodium hydroxide solution is dependent on a salt splitting action to create sodium hydroxide from salts in the concentrated sodium hydroxide solution.

9. The method as described in claim 6 wherein said solution containing sodium salts is dependent on an aion ion exchange resin to create sodium hydroxide from the solution containing sodium salts.

10. The method as described in claim 1 wherein said sodium hydroxide solution is dependent ion a salt splitting action to create sodium hydroxide from salts in the concentrated sodium hydroxide solution.

11. The method as described in claim 1 wherein said concentrated sodium hydroxide solution contains sodium sulfide.

12. The method as described in claim 1 wherein said acid is selected from the group consisting of sulfuric acid, hydrochloric acid, and mixtures thereof.

13. The method as described in claim 1 wherein said acid is selected from the group consisting of acetic acid, formic acid, and mixtures thereof.

14. The method as described in claim 1 wherein said acid is carbon dioxide is provided from a flue gas.

15. The method as described in claim 1 wherein the concentrated sodium hydroxide solution contains about 40% sodium hydroxide to about 10% sodium hydroxide.

16. The method as described in claim 1 wherein sodium hydroxide is combined with the solution containing sodium hydroxide.

17. The method as described in claim 1 wherein said solution containing sodium hydroxide containing depolymerized lignins is supplied from black liquor formed by means of a kraft pulping digestion.

18. The method as described in claim 1 wherein said solution containing sodium hydroxide containing depolymerized lignins is supplied from black liquor formed by means of a soda pulping digestion.

19. The method as described in claim 1 wherein heretofore combined sodium hydroxide solution is reacted with hydrogen sulfide to form sodium sulfide.

20. The method as described in claim 1 wherein said depolymerized lignins substantially free of sodium is substantially dehydrated with a dryer utilizing a flu gas to supply heat for water of evaporation.

21. The method as described in claim 1 wherein said extracting with water is accomplished by counter flow of water.

* * * * *